Oct. 10, 1933.                 J. G. McDONOUGH                1,929,703
                             LUMBER MARKING MACHINE
                             Filed Aug. 18, 1930        10 Sheets-Sheet 1

Fig.1

INVENTOR
JOSEPH G. McDONOUGH
ATTORNEYS

Oct. 10, 1933.　　J. G. McDONOUGH　　1,929,703
LUMBER MARKING MACHINE
Filed Aug. 18, 1930　　10 Sheets-Sheet 3

INVENTOR
JOSEPH G. McDONOUGH
By Paul, Paul & Moore
ATTORNEYS

Oct. 10, 1933.　　　J. G. McDONOUGH　　　1,929,703

LUMBER MARKING MACHINE

Filed Aug. 18, 1930　　　10 Sheets-Sheet 5

INVENTOR
JOSEPH G. McDONOUGH
By Paul, Paul Moore
ATTORNEYS

Oct. 10, 1933.                J. G. McDONOUGH                1,929,703
                            LUMBER MARKING MACHINE
                    Filed Aug. 18, 1930            10 Sheets-Sheet 6

INVENTOR
JOSEPH G. McDONOUGH
By Paul, Paul & Moore
ATTORNEYS

Oct. 10, 1933.                J. G. McDONOUGH                1,929,703
                              LUMBER MARKING MACHINE
                              Filed Aug. 18, 1930           10 Sheets-Sheet 7

INVENTOR
JOSEPH G. McDONOUGH
By Paul, Paul & Moore
ATTORNEYS

Oct. 10, 1933.   J. G. McDONOUGH   1,929,703
LUMBER MARKING MACHINE
Filed Aug. 18, 1930   10 Sheets-Sheet 9

INVENTOR
JOSEPH G. McDONOUGH
By Paul, Paul & Moore
ATTORNEYS

Oct. 10, 1933.    J. G. McDONOUGH    1,929,703
LUMBER MARKING MACHINE
Filed Aug. 18, 1930    10 Sheets-Sheet 10

Fig.25

INVENTOR
JOSEPH G. McDONOUGH
By Paul, Paul & Moore
ATTORNEYS

Patented Oct. 10, 1933

1,929,703

UNITED STATES PATENT OFFICE 1,929,703

LUMBER MARKING MACHINE

Joseph G. McDonough, New Orleans, La.; Louise Allgeyer McDonough administratrix of said Joseph G. McDonough, deceased Application August 18, 1930. Serial No. 475,992

24 Claims. (Cl. 101—43)

This invention relates to new and useful improvements in machines for applying identification marks to lumber such, for example, as trademarks, or other marks denoting the grade or quality of the lumber.

An object of the invention is to provide a lumber marking machine adapted for use in connection with a lumber feeding means to apply a mark to each piece of lumber traveling over the feeding means, said machine being provided with means whereby an inspector stationed adjacent to the feeding means may inspect each piece of lumber and cause said marking machine to apply the proper mark thereto.

A further object is to provide a machine for applying identification marks to lumber, comprising a marking element positioned adjacent to the normal line of travel of the lumber and having means for forcibly moving each piece of lumber into engagement with the marking element, whereby an identification mark will be impressed in a surface thereof.

A further object is to provide a lumber marking machine comprising means for yieldably supporting a piece of lumber in position opposite a marking element, and a member adapted to impinge against the lumber and move it into engagement with said marking element to receive an identification mark.

A further object is to provide a machine of the class described, comprising a plurality of marking dies supported upon a movable carrier in a position beneath the line of travel of the lumber to be marked, a stop member for temporarily interrupting the travel of each piece of lumber when it reaches a position opposite a selected die, and a movable member adapted to impinge against the piece of lumber positioned over the die and forcibly move it into engagement therewith, whereby an identification mark will be impressed in a surface of the lumber.

A further object is to provide a machine for applying identification marks to lumber, including a marker unit comprising a movable die carrier having a plurality of dies mounted thereon provided with a suitable inking means, and a manually controlled selector mechanism for actuating said die carrier to move a selected die into position to be engaged by a piece of lumber.

A further object is to provide a machine of the class described, comprising a marking element, a member adapted to move the lumber into engagement with said marking element to receive an identification mark, and means for feeding the lumber between said element and said member.

Other objects of the invention reside in the construction of the marker unit which includes a stop member adapted to be engaged by the traveling lumber and cause it to temporarily come to rest in a position opposite a selected die; the means for yieldably supporting each piece of lumber while at rest, whereby it may be moved into engagement with the die; the pneumatically operated member provided in connection with the marker for forcibly moving each piece of lumber into engagement with a selected die; the means provided for inking the marking dies, which is so constructed that it may be quickly rendered inoperative whereby a non-inked impression may be applied to the lumber; in the construction of the selector unit which is so constructed that by the simple manipulation of a push button, said selector unit will automatically cause a selected die to be moved into position to be engaged by a piece of lumber, and which push button indirectly controls the operation of the hammer and stop member; and, in the general construction of the machine as a whole, whereby it is particularly well adapted for use for marking rapidly moving lumber of various sizes being conveyed by a lumber feeding means such, for example, as transfer belts, chains, or other conveyors over which the lumber may be fed to a desired destination.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

*Lumber feeding means*

The grading of lumber is generally determined by its good or presentable face, and the lumber is therefore usually observed by an inspector who determines the grade of the lumber before it reaches the marking machine. To prevent defacement of the lumber, the mark is preferably impressed upon the bottom side or surface of the board, and when ink is used, as is common, the mark must be impressed into the surface of the lumber to prevent the ink from smearing or defacing the finished face or surface of another board, when the pieces of lumber are stacked one upon another. When a marking machine is used in connection with two or more planers, for marking each piece of lumber discharged therefrom onto a suitable feeding means, the marker must be so constructed that the inspector stationed along side of the feeding means can readily control the operation of the marker, so that a selected die may be brought into position to be engaged by each piece of lumber passing the marker, whereby each piece will receive its proper mark. Speed of operation is an important factor, and the present machine has been designed so that an inspector stationed along side of the traveling lumber can readily and quickly cause the marking machine to position the proper die for a given board so that each board passing the marking machine will receive its proper mark.

Figure 1:
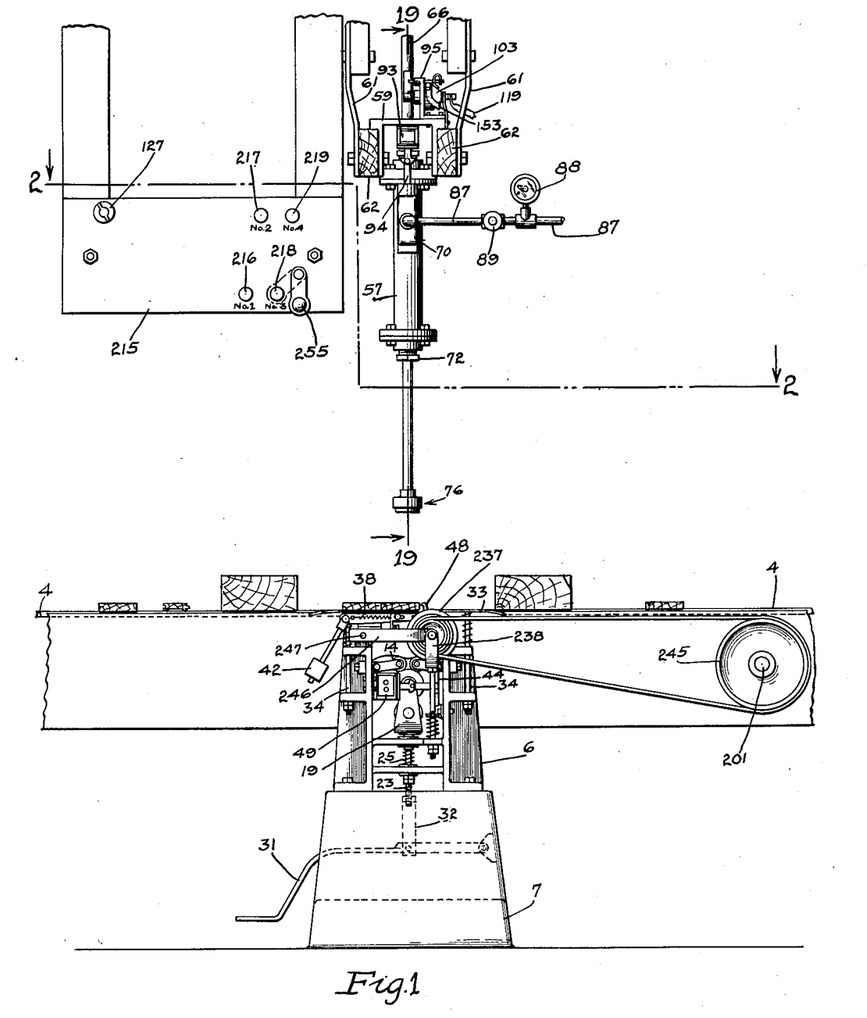
Figure 1 is an elevational view of my improved machine showing the hammer in normal elevated position.
Figure 2:
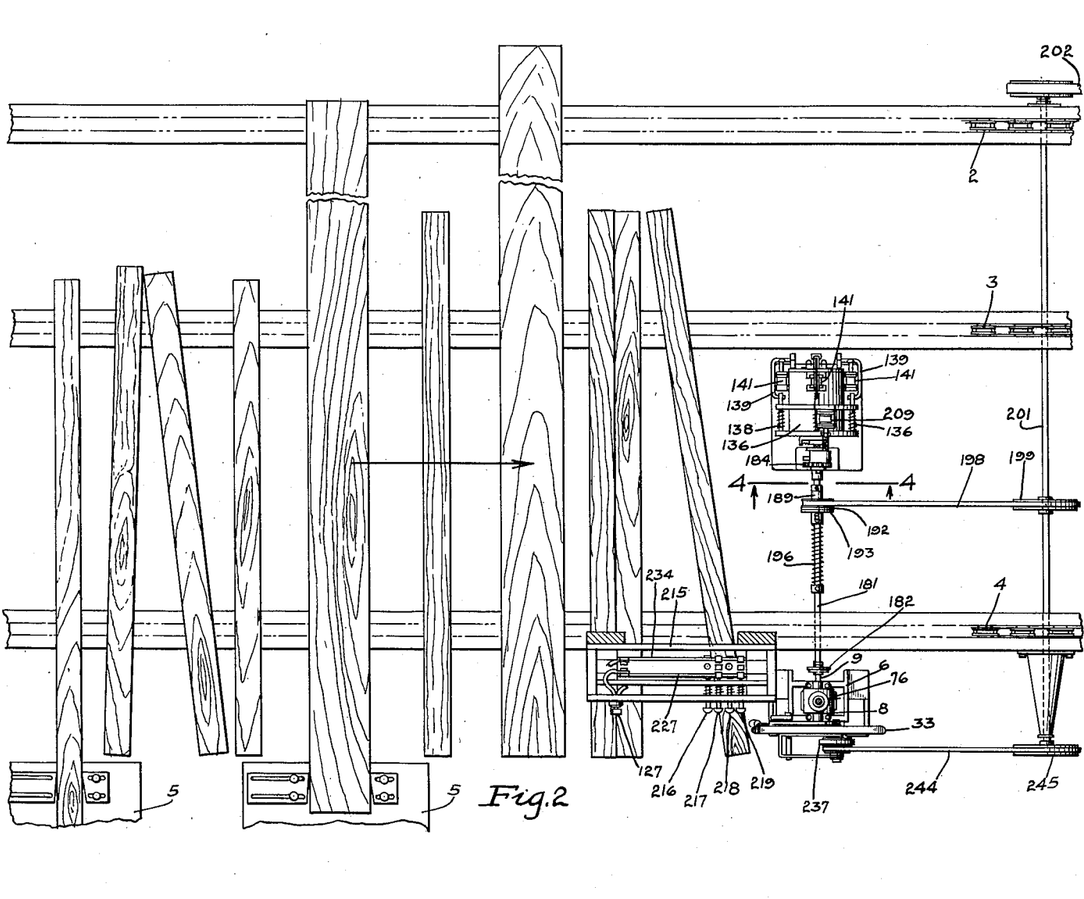
Figure 2 is a sectional plan view on the line 2—2 of Figure 1, showing boards of different sizes being fed to the marking mechanism.

The novel lumber marking machine featured in this invention is illustrated in Figures 1 and 2, as used in connection with a lumber feeding means. The lumber feeding means, here shown, comprises a plurality of conveyer chains 2, 3, and 4 adapted to be actuated by a suitable operating means, not shown. The lumber is here shown delivered onto the conveyer chains from a plurality of planers 5, portions of which are shown in the lower left hand corner of Figure 2.

*Marker unit*

Figure 10:
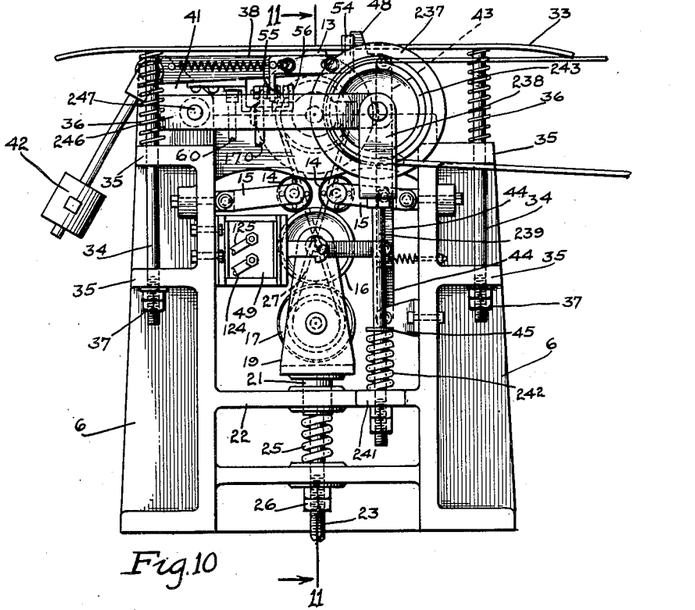
Figure 10 is a side elevation of the marking mechanisms.
Figure 11:
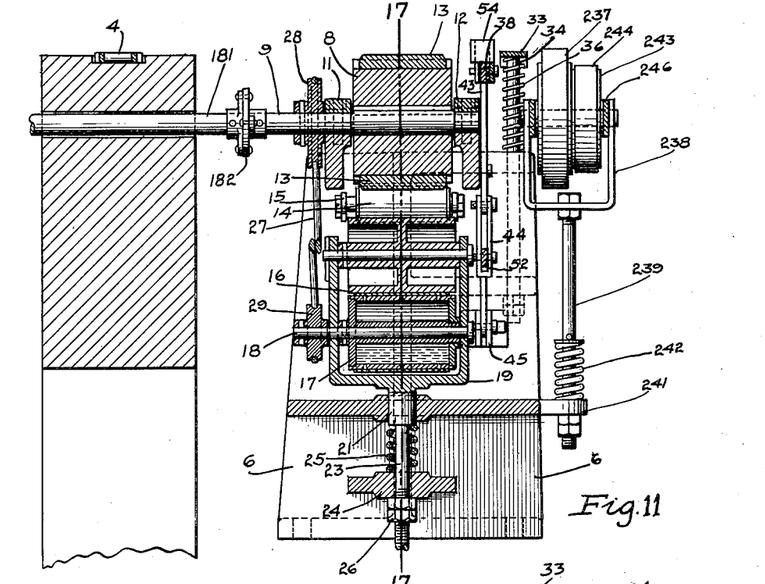
Figure 11 is a sectional view on the line 11—11 of Figure 10, showing the relative positions of the die carrier and the ink well.
Figure 12:
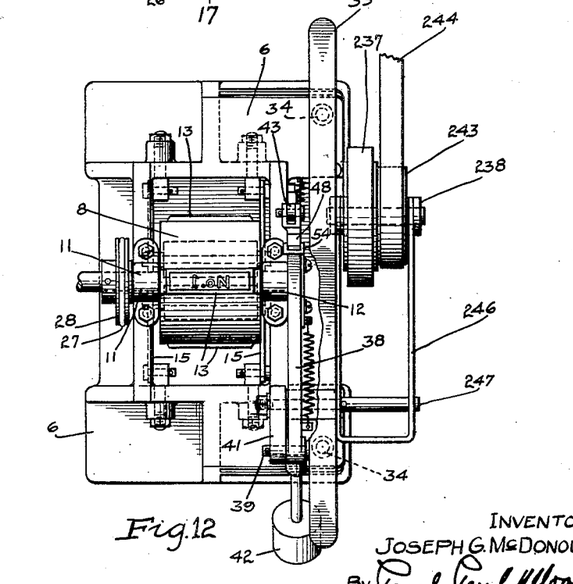
Figure 12 is a plan view of Figure 10.
Figure 13:
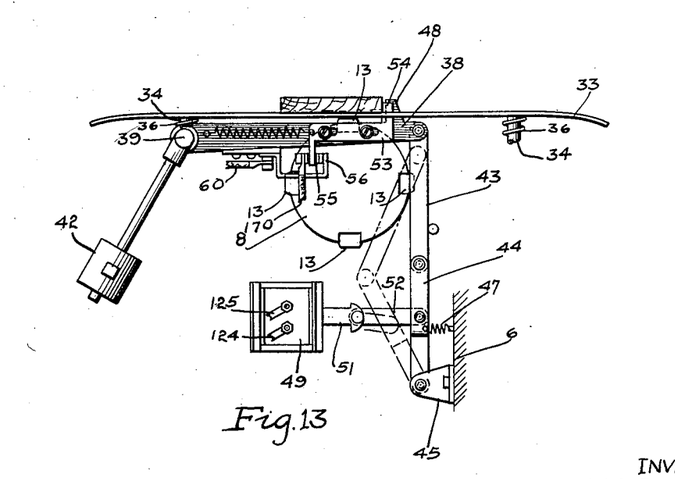
Figure 13 is a diagrammatic view showing the means for stopping the lumber in marking position above the die, and also the means for actuating said stop means.

The marker unit is shown in Figures 10, 11, 12, and 13, and comprises a suitable frame 6 mounted upon a foundation 7, as indicated in Figure 1. A die carrier 8 is mounted upon a shaft 9 supported in suitable bearings 11 and 12 provided in the upper portion of the frame 6, as shown in Figures 10, 11, and 12. A plurality of marking dies 13 are demountably secured to the periphery of the carrier 8, in spaced relation, as shown in Figure 13. In the drawings, I have shown four such marking dies, but it is to be understood that more or less dies may be employed, as desired.

Means are provided for inking the dies 13 when an inked impression is to be applied to the lumber. Such means consists of a pair of inking rollers 14 supported upon pivoted arms 15, as shown in Figure 10. These inking rollers are constructed of a suitable ink-absorbing material, such as felt, so that the ink will adhere thereto and, whereby, when the dies engage the peripheries of the inking rollers, the surfaces thereof will be inked.

Ink is supplied to the rollers 14 from a transfer roller 16, peripherally engaged with a rotatably mounted ink container or well 17, fixed to a shaft 18 rotatably mounted in a yoke 19 which also supports the transfer roller 16. The yoke 19 has a depending cylindrical extension 21 mounted for up-and-down movement in a suitable bearing provided in the cross member 22 of the frame 6. The cylindrical extension 21 has a reduced portion 23 guidingly supported in a guide 24 of the frame 6. About this reduced portion is coiled a suitable spring 25, one end of which is seated against the lower end of the cylindrical extension 21 and the other end against the upper face of the guide 24, whereby an upward pressure is exerted against the yoke 19 to cause the inking rollers 14 to be held in position to be engaged by the die faces, as the die carrier is rotated. Adjusting nuts 26 are mounted upon the lower end of the reduced portion 23 to limit the upward movement of yoke 19.

The ink well 17 is operatively connected with the shaft 9 by means of a drive belt 27 mounted upon pulleys 28 and 29 secured to the shafts 9 and 18, respectively, as best shown in Figure 11. Thus, when the die carrier 8 is rotated, the ink well 17 will be simultaneously rotated, thereby imparting a rotary movement to the transfer cylinder 16 and inking rollers 14.

Means are provided for positioning the inking rollers so that they will not engage the faces of the dies, whereby a non-inked impression may be made in the surface of the lumber. Such a means is shown in Figure 1, and may consist of a foot pedal 31, pivotally supported in the foundation 7 of the marker frame 6 and having a link 32 connecting it with the reduced portion 23 of the yoke 19. When the foot pedal 31 is depressed, it will move the yoke 19 downwardly against the tension of the spring 25, whereby the inking rollers 14 will likewise move downwardly so that the die faces may pass thereby without engaging the peripheries of said rollers. As soon as the operator releases the foot pedal 31, the spring 25 will return the yoke 19 to its normal operative position, whereby the inking rollers will again contact with the die faces as the latter are rotated about the axis of the shaft 9.

A yieldable support is provided upon the marker unit for supporting each piece of lumber as it temporarily comes to rest over the die carrier in position to receive a mark. This support comprises a plate 33 secured to the upper ends of a pair of rods 34 slidably supported in guides 35 provided upon the frame 6, as best shown in Figure 10. Suitable compression springs 36 are coiled about the rods 34 between the plate 33 and the upper guides 35. These springs constantly urge the plate 33 in an upward direction which movement is limited by the adjusting nuts 37 provided at the lower ends of the rods 34.

Lumber stop means

Means are provided for temporarily interrupting the traveling movement of each piece of lumber, when it reaches the die carrier 8. This stop member is best shown in Figures 13 to 16, inclusive, and comprises an arm 38 pivotally supported upon a pin 39, shown secured to an upright lug 41 provided upon the upper left hand side of the frame 6. (See Figures 10 and 12.) A counter-weight 42 is operatively connected with the arm 38 and normally tends to move it in an upward direction, as will readily be understood by reference to Figures 13 to 16, inclusive. Toggle links 43 and 44 connect the swinging end of the arm 38 with a bracket 45 secured to the frame 6. These toggle links are normally retained in the full line position shown in Figure 13 against a stop, by a suitable spring 47. A detent 48 is provided upon the arm 38 which projects upwardly into the path of the traveling lumber when the arm is positioned as shown in Figure 13. When the toggle links 43 and 44 are moved to the dotted line position shown in Figure 13, the arm 38 will be moved downwardly, whereby the detent 48 will move out of engagement with the lumber and permit the latter to pass on. This, however, does not occur until after the lumber has received an identification mark in the lower or bottom surface thereof, as will subsequently be described.

The toggle links 43 and 44 are adapted to be actuated by a solenoid 49 having an armature 51 which is connected to the toggle link 44 by a link 52. Energization of the solenoid 49 will move the toggle links to the dotted line position, shown in Figure 13, and when the solenoid is deenergized, the links will be returned to the full line position, shown in this figure by the combined actions of the weight 42 and spring 47.

A circuit-closer 53 is slidably mounted upon the arm 38 and has a finger 54 adapted to be engaged by the lumber. A contact member 55 is secured to the circuit-closer 53 and is insulated therefrom. The movable contact 55 is adapted to engage a fixed contact 56 here shown supported directly upon the arm 38, as clearly shown in Figures 13 to 16, inclusive.

Hammer mechanism

Figure 19:
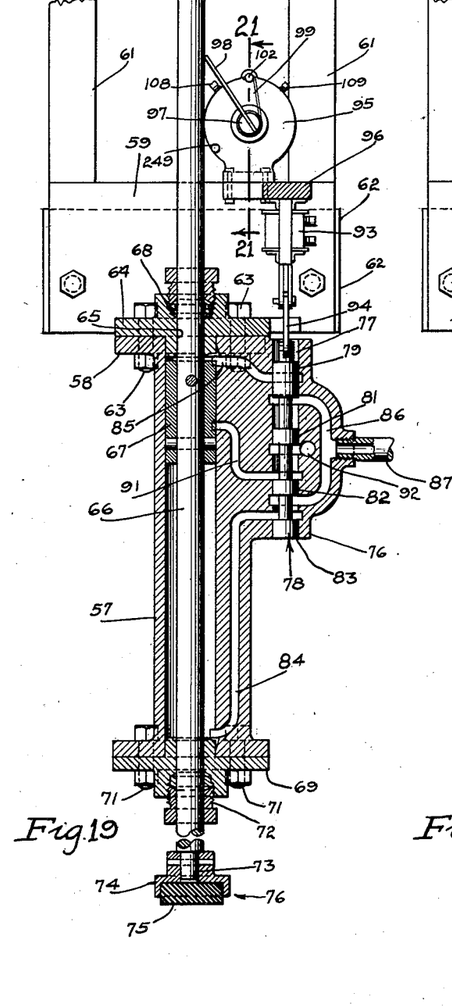
Figure 19 is an enlarged detail sectional view showing the means for operating the hammer, the latter being shown in normal elevated position.
Figure 20:
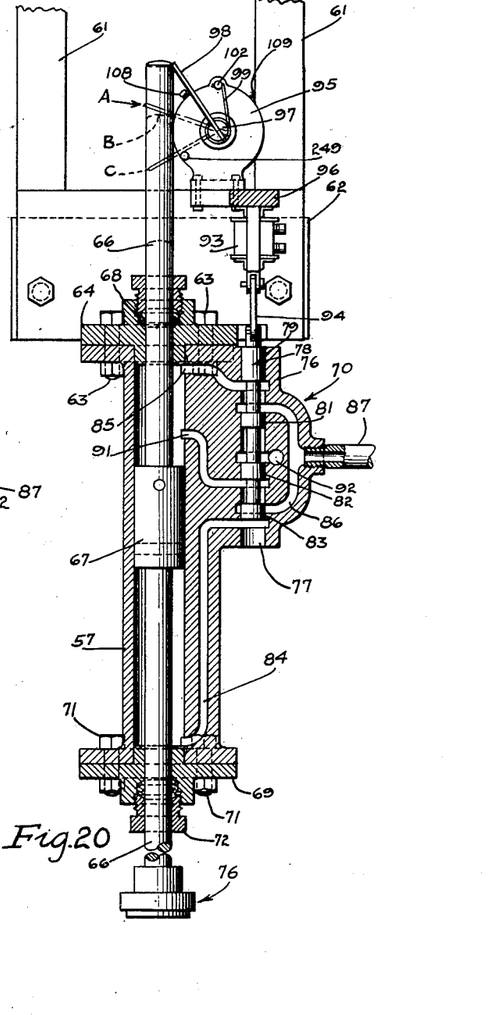
Figure 20 is a similar view showing the valve positioned to cause actuation of the hammer.

The means provided for forcibly moving the lumber into engagement with the die is shown in Figures 19 and 20, and comprises a cylinder 57 having a flanged head 58 secured to a suitable frame 59, here shown as being of cast metal and supported by suitable hangers 61 depending from an overhead support, not shown. Suitable filler blocks 62 are shown interposed between the hangers 61 and the frame 59 as shown in Figure 1. Bolts 63 secure the flange 58 of the cylinder to the portion 64 of the frame 59, as shown in Figures 19 and 20. The portion 64 provides a head for the cylinder and has a bearing 65 therein adapted to slidably receive the upper end of a piston rod 66. A piston 67 is secured to the piston rod within the cylinder 57. A suitable stuffing box is provided in the cylinder head 64 to prevent leakage from the upper end of the cylinder.

A head 69 is secured to the lower end of the cylinder by means of bolts 71 and, like the head 64, is provided with a stuffing box 72 to prevent leakage from the lower end of the cylinder around the depending portion of the piston rod 66. The lower end of the piston rod is shown provided with a reduced portion 73 adapted to receive a head 74 having a flexible material 75 such, for example, as rubber, embedded in the face thereof. This head provides a hammer adapted to impinge against or strike the board to forcibly move it into engagement with the selected die.

The hammer, which the head 74 will hereinafter be termed, is here shown as being operated by a suitable pressure fluid, and means are therefore provided for controlling the flow of pressure fluid to and from the cylinders. The casing of the cylinder 57 is shown in Figures 19 and 20 as having a lateral projection 76 which provides in effect the casing of a control valve 70 adapted to house a slide valve 78 for controlling the flow of the air to and from the opposite ends of the cylinder. The slide valve 78 is mounted in a bore 77 provided in the valve casing 76, and the valve 78 has enlarged portions 79, 81, 82, and 83, adapted to fit within the bore 77. A port 84 connects the lower end of the cylinder with the lower portion of the bore 77 of the control valve, and a port 85 likewise connects the upper end of the cylinder with the upper portion of the bore 77 of the valve. A U-shaped passage 86 connects the opposite end portions of the bore 77 with an air supply pipe 87, which leads from the valve to a suitable source of fluid supply, not shown.

A suitable pressure control gauge 88 is interposed in the fluid supply pipe 87, which is adapted to maintain a constant reduced pressure in the connection 87 between the gauge and the cylinder. The fluid pressure in the pipe 87 at the right hand side of the gauge 88, when viewed as shown in Figure 1, may be relatively higher than it is at the opposite side thereof. A shut-off valve 89 is provided in the pipe connection 87 between the cylinder and gauge 88, whereby the supply of air to the cylinder may be entirely cut off.

An exhaust port 91 is provided in the slide valve 70 and connects the upper portion of the cylinder with an intermediate portion of the bore 77 of the valve, so that when the slide 78 is in its lowermost position, as shown in Figure 19, the exhaust port 91 will communicate with an exhaust 92 connecting the intermediate portion of the bore 77 with the atmosphere. The distance between the intake port 85 and the exhaust passage 91, at the places where they connect with the interior of the cylinder, is such as to cause a portion of the pressure fluid to become trapped in the upper portion of the cylinder, upon the upstroke of the piston. This entrapped air provides a cushion for the piston so that it will not forcibly impinge against the upper cylinder head 64.

The slide 78 of the valve 70 is normally retained in the position shown in Figure 19 by gravity. The armature of the solenoid 93 is connected by a link 94 to the upper end of the slide 78. When the piston 67 is in its normal elevated position, as shown in Figure 19, the circuit to the solenoid 93 will be open and the slide 78 will be in its lowermost position, thereby causing the intake 84 to be in direct communication with the air passage 86 connected with the supply pipe 87. To lower the piston and to cause the hammer to impinge against a board, the circuit to the solenoid 93 is closed, whereupon the slide 78 will move upwardly to the full line position, shown in Figure 20, by the action of the solenoid 93, thereby directly connecting the upper intake 85 with the intermediate air passage 86, as shown in Figure 20, permitting air to be supplied to the upper end of the cylinder and move the plunger downwardly.

When the slide 78 is in the position shown in Figure 20, the intake port 84 will be open to the atmosphere so that the air may exhaust from the lower portion of the cylinder during the downward stroke of the piston. Before the piston reaches the limit of its downward movement, however, the circuit to the solenoid 93 will be opened, whereupon the slide 78 will drop by gravity to the position shown in Figure 19, and close the port 84 to the atmosphere, and, at the same time, connecting the port 84 with the supply passage 86, whereby air will be admitted into the lower portion of the cylinder to return the piston to its normal position shown in Figure 19.

Timing mechanism

Figure 21:
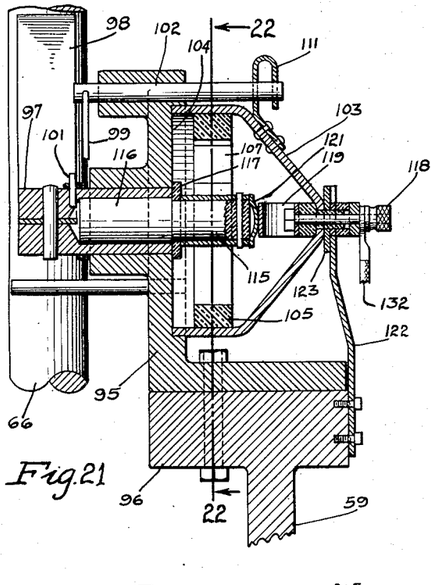
Figure 21 is an enlarged detail sectional view on the line 21—21 of Figure 19, showing the timer.
Figure 22:
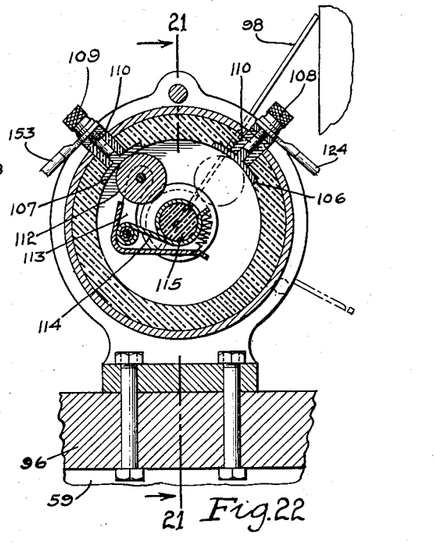
Figure 22 is a sectional view on the line 22—22 of Figure 21.

Means is provided for controlling the operations of the various elements of the apparatus, and consists of a timer, best shown in Figures 21 and 22. This timer comprises a bracket 95 shown secured to the cross member 59 supporting the cylinder 57 (see Figures 19 and 20). A rock shaft 97 is mounted in a bearing provided in a bracket 95 and has a flexible member 98 suitably secured thereto, one end of which is adapted to engage the upper end of the piston rod 66 as shown in Figures 19 and 20. A suitable spring 99 constantly urges the member 98 in a direction to engage the piston rod 66. One end of this spring is suitably coiled about the rock shaft and is secured thereto by a suitable pin 101, while the opposite end of the spring is anchored to a pin 102 mounted in the upper portion of the bracket 95.

A housing 103 is mounted in a seat 104 provided in the bracket 95 and has an annular member 105, of insulating material, suitably secured therein, having a pair of contacts 106 and 107 provided with terminal posts 108 and 109, respectively. These contacts are insulated from the housing by suitable insulating sleeves 110, as shown in Figure 22. The housing is provided with a lug 111 which is engaged with the pin 102 to prevent rotation of the housing when the apparatus is in operation.

A movable contact is provided upon the rock shaft 97, and consists of a roller 112 supported in one end of a bell crank 113 which is pivotally mounted upon a member 114 secured to an insulated pin 115, here shown having an enlarged portion 116 non-rotatably received in a socket provided in the rock shaft 97. A suitable insulating washer 117 is interposed between the end of the rock shaft and the member 114 to electrically insulate these members from one another.

Figure 25:
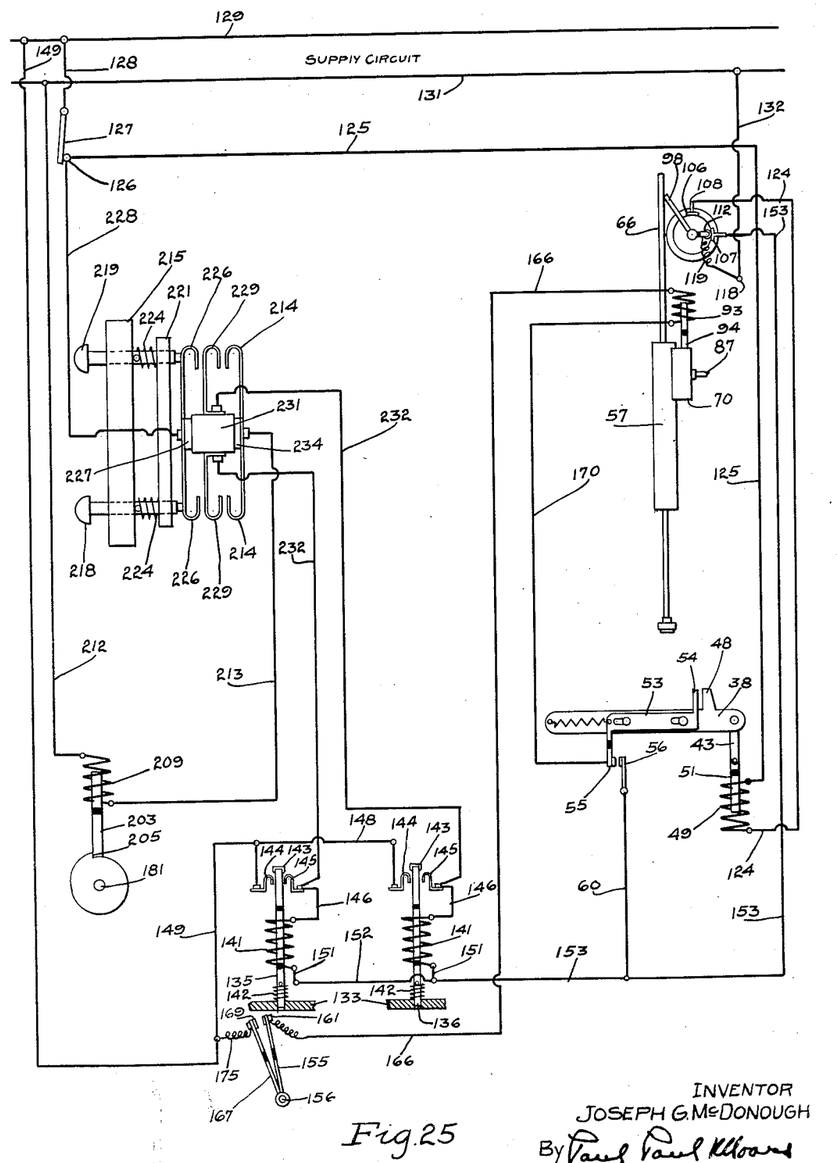
Figure 25 is a schematic wiring diagram showing the parts in normal positions.

A terminal post 118 is mounted in the housing 103 and insulated therefrom, and has a flexible contact 119 engaged with a plate 121 suitably secured to the end of the hub of the member 114, whereby the terminal post 118 is electrically connected with the contact roller 112. The housing 103 is retained in the seat 104 by means of a flexible member 122, secured to the cross member 96 and engaged with a washer 123 bearing against the center of the housing as will readily be understood by reference to Figure 21. The contact 108 has a wire 124 connecting it with one end of the solenoid coil 49, and the other end of this coil has a wire 125 connecting it with the terminal post 126 of a cutout switch 127. The other side of this switch is connected by a wire 128 to the conductor 129 of a supply circuit composed of the conductor 129 and 131, as shown in Figure 25. The movable contact 112 of the timer has a wire 132 connecting it with the conductor 131 of the supply circuit.

Selector mechanism

Figure 3:
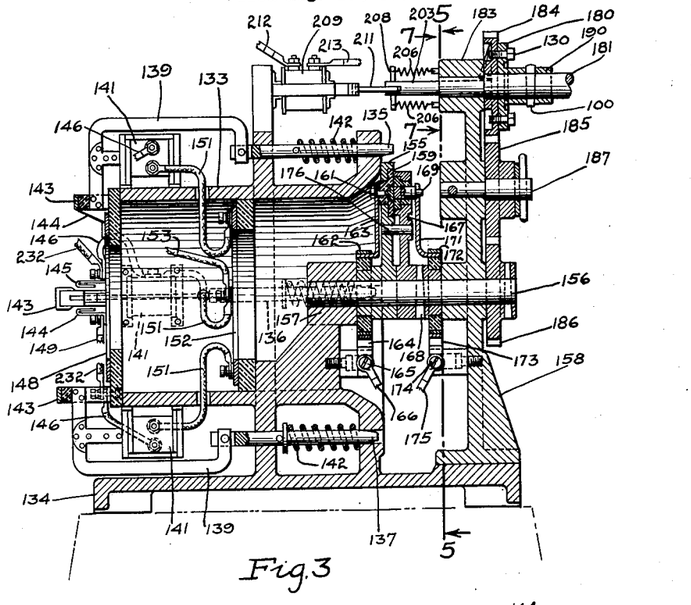
Figure 3 is an enlarged detail sectional view on the line 3—3 of Figure 4, showing the selector mechanism.
Figure 4:
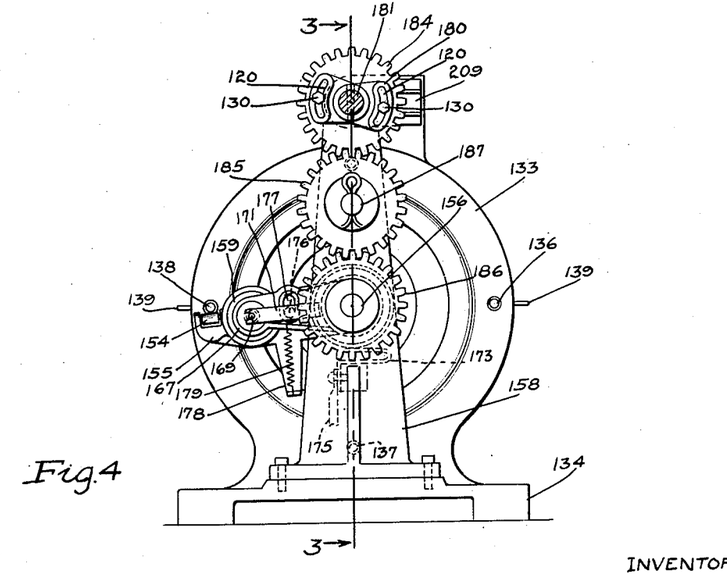
Figure 4 is a sectional view on the line 4—4 of Figure 2.
Figure 5:
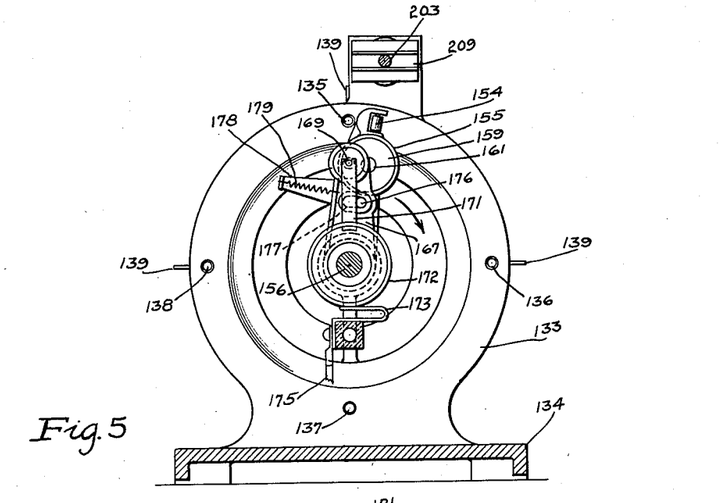
Figure 5 is a sectional view on the line 5—5 of Figure 3.

The selector mechanism is best shown in Figures 3, 4 and 5, and provides means whereby a selected die may be quickly moved into position to be engaged by a piece of lumber, by the simple manipulation of a single push button. The selector mechanism is shown comprising a suitable supporting structure or frame 133, preferably cylindrical in cross section, and provided with a suitable base 134. A plurality of selector stop pins 135, 136, 137, and 138 are slidably mounted in guides provided in the frame 133 and have connections 139 with a like number of solenoids 141, as shown in Figure 3.

Suitable springs 142 are coiled about the selector stop pins and constantly tend to move them into their inoperative retracted positions, as shown in the lower portion of Figure 3. When one of the solenoid coils 141 is energized, the stop pin connected therewith will be moved to its operative position, shown in the upper portion of Figure 3. One stop pin is required for each die on the die carrier 8, so that if the number of dies on the carrier were increased to more than four, the number of stop pins would be correspondingly increased.

Each selector stop pin is provided at one end with a bridge member 143, adapted to bridge a gap between a pair of fixed contacts 144 and 145 and thus close a circuit, each time a stop pin is moved to its operative position, as shown in the upper portion of Figure 3. Wires 146 connect the contacts 145 with their respective solenoid coils 141, and the contacts 144 are electrically connected with a conductor ring 148, having a wire 149 connecting it with the main line conductor 129, as shown in Figure 25. The opposite ends of the solenoid coils 141 are connected by wires 151 to a conductor ring 152 having a wire 153 connecting it with the fixed contact 107 of the timer.

When one of the selector stop pins is positioned as shown in the upper portion of Figure 3, the projecting terminal thereof will be engaged by a roller 154 mounted upon a rotary contact arm 155, loosely mounted upon a stub shaft 156 having one end supported in a bearing 157 of the housing 133, and its opposite end suitably supported in a bearing provided in an upright bracket 158, secured to the base 134 of the housing 133. (See Figures 3 and 4.)

An insulating member 159 having an enlarged head, is mounted in the rotary arm 155, and has a contact 161 mounted therein, whereby said contact will be electrically insulated from the arm. A collector ring 162 is supported upon the hub of the arm 155 in insulated relation and has a flexible member 163 connecting it with the contact 161, as best shown in Figure 3. A brush 164 electrically connects the ring 162 with a terminal post 165, having a wire 166 connecting it with one side of the solenoid coil 93 of the control valve 70. A wire 170 connects the other side of the solenoid 93 with the movable contact 55 of circuit-closer 53 mounted upon the arm 38, as best shown in Figure 25.

A contact arm 167 is mounted upon the shaft 156 adjacent to the arm 155, but is fixed to the shaft for direct rotation therewith by a pin 168. This arm, like the arm 155, carries a contact 169 suitably insulated from the arm and having a flexible connection 171 with a collector ring 172 suitably secured to the hub of the arm 167 in insulated relation, as shown in Figure 3. A brush 173 connects the ring 172 with a terminal post 174, having a wire 175 connecting it with the wire 149, leading to the conductor 129 of the supply circuit. (See Figure 25.)

The movable arm 155 has a pin 176 secured therein which is received in a slot 177 provided in the fixed arm 167. The arm 155 has a lateral extension 178 to which one end of a spring 179 is attached, the opposite end of which is connected to the fixed arm 167, so that the arms are normally retained in the positions shown in Figure 5, wherein it will be noted that the contacts 161 and 169 are out of electrical connection with each other.

*Driving connection between marker and selector units*

Figure 9:
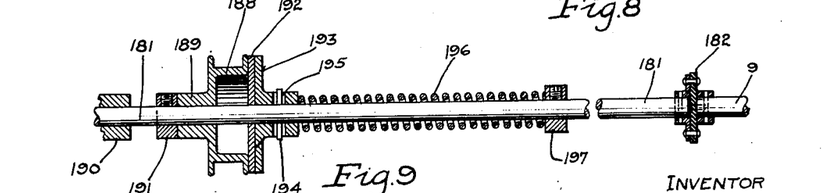
Figure 9 is a longitudinal sectional view showing the friction drive for the marker and selector mechanism.

The driving connection between the marker and selector units is best shown in Figures 2 and 9, and comprises a shaft 181 connected to the shaft 9 of the marker unit by a suitable flexible coupling 182. The opposite end of the shaft 181 is supported in a bearing 183 provided in the upper portion of the bracket 158, as shown in Figure 3. A gear wheel 184 is adjustably secured to the flange 180 of a sleeve 190 secured to the shaft by means of a pin 100. Arcuately formed slots 120 are provided in the flange 180 adapted to receive bolts 130 for securing the gear 184 to the flange. By thus adjustably mounting the gear upon the shaft 181, the die carrier may be relatively adjusted to align the selected die with the hammer. The gear 184 meshes with an intermediate pinion 185 meshing with a gear 186 secured to the shaft 156, upon which the contact arms 155 and 167 are mounted. The intermediate pinion 185 is supported upon a suitable stud 187 secured to the bracket 158.

A flanged pulley 188 is mounted for relative rotation upon the shaft 181 and has a hub 189 engaged with a collar 191 secured to the shaft, as shown in Figure 9. A suitable friction disk 192 is engaged with the opposite side of the pulley 188 and is held in frictional engagement therewith by a flanged member 193 non-rotatably mounted upon the shaft 181 by means of a pin 194 secured to the shaft and traversing an elongated opening or slot 195 provided in the hub of the flanged member 193. A compression spring 196 has one end engaged with the hub of the member 193, and its opposite end seated against a collar 197 fixed to the shaft 181.

The flanged pulley 188 is adapted for continuous rotation by means of a belt 198 connecting it with a pulley 199 secured to a drive shaft 201 having a belt connection 202 with a suitable source of power, not shown. (See Figure 2). It will thus be seen that rotary movement is imparted to the shaft 181 by means of the friction disk 192 held in frictional engagement with the face of the pulley 188 by the member 193 under the influence of the compression spring 196.

Figure 6:
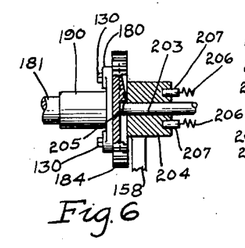
Figure 6 is a detail sectional view on the line 6—6 of Figure 7.
Figure 7:
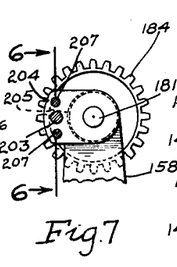
Figure 7 is a detail sectional view on the line 7—7 of Figure 3.
Figure 8:
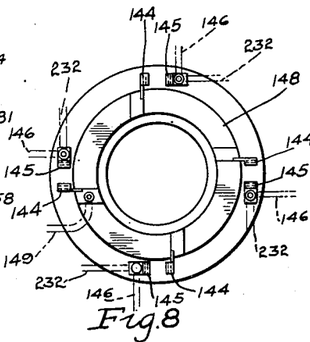
Figure 8 is a diagrammatic view illustrating the relative positions of the fixed contacts for the selector stop pins.

Means are provided for arresting the movement of the rotary contact arms 155 and 167 at the conclusion of each cycle of operation. Such means is shown in Figures 3, 6, and 7, and consists of an abutment pin 203 slidably mounted in a suitable guide 204 provided in the upper portion of the bracket 158, and adapted to engage an abutment 205 provided upon the inner face of the upper gear wheel 184, as shown in Figures 3 and 6. The abutment pin 203 is constantly urged in a direction towards the gear wheel 184 by suitable tension springs 206, having one end secured to a pin 207 suitably fixed in the guide 204, and having their opposite ends engaged with a cross pin 208 terminally mounted in the outer end of the abutment pin 203. A solenoid 209 is mounted upon the upper portion of the frame 133, as shown in Figure 3, and has its armature connected to the pin 203 by means of a link 211. A wire 212 connects one end of the solenoid 209 with the main line conductor 131, and the opposite end of the solenoid coil has a wire 213 connecting it with a pair of flexible contacts 214 provided upon a control panel 215, which will next be described.

*Control means*

Figures 23, 24:
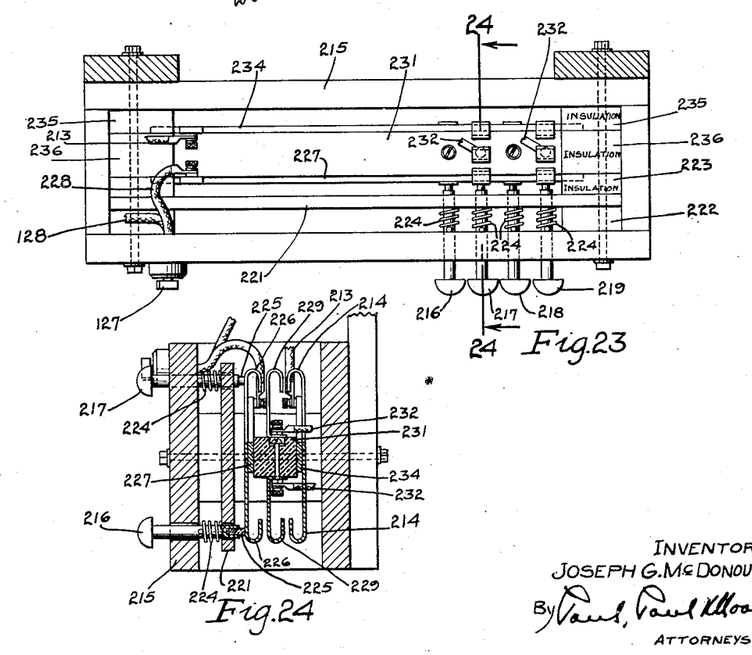
Figure 23 is a plan view of the control panel.
Figure 24 is a sectional view on the line 24—24 of Figure 23.

The means for manually controlling the operation of the marker and selector units is best shown in Figures 23, 24, and 25, and consists of the panel 215 having a plurality of push buttons 216, 217, 218, and 219, each representing a certain lumber grade or mark, as for example No. 1, No. 2, No. 3 and No. 4, as indicated in Figure 1. These push buttons are shown slidably mounted in the panel 215 and in a guide plate 221 secured between insulating blocks 222 and 223. Springs 224 retain the push buttons in their normal positions.

The shank of each push button is shown provided with an insulated tip 225 adapted to engage a flexible contact 226 electrically secured to a bus bar 227. This bus bar is connected by a wire 228 to the terminal 126 of the cutout switch 127, as shown in Figure 25. Contacts 229 are secured to an insulating block 231 and are connected by wires 232 to the fixed contacts 145 of the solenoids 141 of the selector stop pins.

The contacts 214 are secured to a bus bar 234 supported between suitable insulating blocks 235 and the enlarged end portions 236 of the insulating block 231, whereby said contacts will be electrically insulated from the contacts 226 and 229.

Lumber separating means

Means is provided for separting the marked piece of lumber from the next following unmarked piece so as to allow ample time for the lumber stop member 48 to return to its normal operative position before the following piece of lumber reaches the marking die. Such means is shown in Figures 1, 2, 14, 15, and 16, and comprises a separating wheel 237, the periphery of which preferably is rubber faced and projects slightly above the surface of the conveyer chains which feed the lumber towards and away from the marker. (See Figures 14, 15 and 16.)

Figure 16:
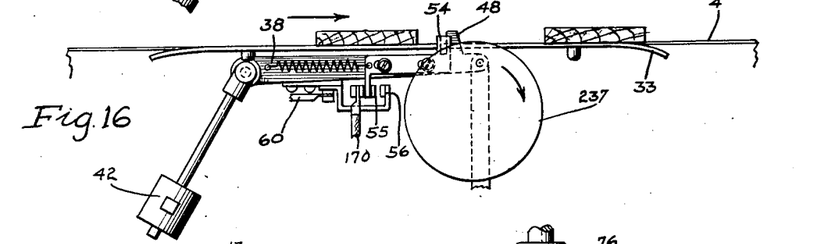
Figure 16 is a view similar to Figure 15, showing the marked piece of lumber separated from a following unmarked piece, and the stop means positioned to interrupt the following piece.

This separating wheel 237 is supported in a yoke 238 having a stem 239 slidably received in a guide 241 provided on the frame 6, as shown in Figure 11. A spring 242 normally holds the wheel 237 in the position shown in Figures 11, 14, 15, and 16, so that as soon as each board has received an identification mark, and the stop member 48 is moved out of engagement with the marked piece of lumber, the latter will engage the periphery of the separating wheel, whereby it will be moved forwardly out of abutting engagement with the next following unmarked piece, as shown in Figure 16, because of the peripheral speed of the wheel 237 being greater than the traveling speed of the conveyer or lumber feed chains 2, 3, and 4. By thus quickly moving the marked piece of the lumber forwardly, the stop member will have ample time to return to its normal operative position to be engaged by the next following piece of lumber, as is clearly illustrated in Figure 16. The separating wheel 237 is operatively connected to a pulley 243 having a belt 244 connecting it with a pulley 245 mounted upon the drive shaft 201, shown in Figures 1 and 2. A member 246 connects the upper end of the yoke 238 with a pin 247 mounted in the lug 41 provided in the marker unit frame 6.

Operation

In the operation of this novel lumber marking apparatus, the pieces of lumber may be delivered onto the conveyer chains 2, 3, and 4 from a series of planers, as indicated at 5—5 in Figure 2, or from some other means. As the lumber travels towards the marker, the inspector, who usually is stationed in front of the control panel 215 or adjacent thereto, inspects each piece of lumber and determines its grade. He then actuates one of the push buttons of the control panel corresponding to the grade of a piece of lumber traveling towards the marking machine, thereby causing the selector unit to function and rotate the die carrier so that a selected die will be positioned to be engaged by the piece of lumber, when the latter is struck by the hammer. (See Figures 13 and 14.)

The selector unit operates in the following manner. Assuming that the inspector determines the grade of a certain piece of lumber as being No. 4; he will then depress the button 219, which will cause the contact 226 to electrically engage the contact 229, thereby closing a circuit from the main line conductor 129, to the solenoid 141 of its respective selector stop pin 136. This circuit is as follows: from the main line conductor 129 through the wire 128, switch 127, terminal 126, wire 228, contacts 226 and 229, wire 232 to the contact 145; through the wire 146 to one side of the solenoid 141; from the other side of the solenoid through the wires 151 and 153, to the contact 107 of the timer; then through the roller contact 112 and its supporting means, connection 119, terminal post 118; and thence through the wire 132 to the conductor 131 comprising the other side of the supply circuit, thus completing the circuit through the solenoid 141 whereby it will actuate the selector stop pin 136 and move it into the position, shown in the upper portion of Figure 3.

Immediately following the closing of the above described circuit, a second circuit is closed through the solenoid 209, whereby the abutment pin 203 is moved out of engagement with the abutment 205, releasing the gear 184 and shaft 156, which is geared thereto, and which operates the contact arms 155 and 167 in the direction indicated by the arrows in Figure 5. The circuit through the solenoid 209 is closed when the contact member 229 is moved into engagement with the contact 214, as best shown in Figure 25. This circuit is as follows: from the main line conductor 129, through the wire 128, switch 127, wire 228, contacts 226, 229, and 214; wire 213, solenoid 209, and wire 212, back to the main line conductor 131.

When the abutment pin 203 disengages the abutment 205, the shaft 181 will be rotated as a result of its operative connection with the pulley 188 and friction disk 192, until the roller 154 on the movable contact arm 155 engages the actuated selector stop pin 136; whereupon the arm 155 will come to rest and the fixed arm 167 will advance against the tension of the spring 179, until the pin 176 engages the opposite end of the slot, causing the fixed arm to come to rest with its contact 169 in electrical connection with the contact 161 of the movable arm 155.

Closing of the contacts 169 and 161 electrically connects one side of the solenoid 93 with the main line circuit, so that when the lumber engages the upright finger 54 of the circuit-closer 53 and moves it forwardly, the contact 55 will engage the contact 56, causing the solenoid 93 to become energized because of the contact 56 being electrically connected to the main line conductor 131, through the wires 60, 153, contacts 107 and 119 of the timer, terminal post 118, and wire 132. Energization of the solenoid 93 will actuate the slide valve 78 and pull it upwardly from the position shown in Figure 19 to that shown in Figure 20, whereby the port 85 will be opened to the supply pipe 87, through the upper portion of the U-shaped passage 86, as shown in Figure 20, thereby causing the pressure fluid to enter the cylinder above the piston and move the piston downwardly into engagement with the lumber.

When the piston rod reaches the position shown in Figure 20, during its downward movement, the member 98 of the timer will move downwardly, controlled by the upper end of the piston rod, and when it reaches the position indicated at A, the movable contact 112 of the timer will move out of electrical connection with the fixed contact 107, thereby breaking the circuit to the solenoid 93, this circuit previously having been closed by actuation of the contacts 161 and 169, and 55 and 56; the latter two contacts being held in closed position because of the board being engaged with the finger 54. Movement of the timer contact 112 out of engagement with the fixed contact 107 also causes the de-energization of the selector stop pin solenoid 141 because of its connection with the wire 153, which connects it to the supply circuit, as hereinbefore described.

De-energization of the solenoid 141 will cause the selector stop pin 136 to return to its normal retracted position by the action of the spring 142, thereby releasing the movable contact arm 155 and permitting the shaft to be rotated in the direction indicated by the arrow in Figure 5, by the action of the friction drive provided on the shaft 181. When the movable contact arm 155 is released from the selector stop pin, the spring 179 will relatively move it upon the shaft 156, whereby the contacts 161 and 169 will become disengaged, thereby opening the wire leading to the solenoid 93. (See Figure 25.) When released, the shaft 156 will continue to rotate until the abutment 205 engages the abutment 203, whereby the selector mechanism will come to rest in its normal position.

When the top of the piston rod moves downwardly from the dotted line position, indicated at B in Figure 20, the member 98 will move to the dotted line position C, against a stop pin 249, whereupon the movable contact 112 of the timer will engage the fixed contact 106 of the timer and cause the energization of the solenoid 49 connected with the lumber stop member 48. Momentary energization of the solenoid 93 will actuate the valve 78 and move it from the position shown in Figure 19 to that shown in Figure 20, whereby air will be introduced into the cylinder beneath the piston and cause it to be returned to its normal position, as shown in Figure 20. This action follows immediately after the hammer has engaged the board.

When the movable contact 112 engages the fixed contact 106 of the timer, as above stated, the solenoid 49 is energized to move the lumber stop member 48 out of the path of the lumber so that the moment the hammer disengages the board in its return movement, the marked piece of lumber will be moved into peripheral engagement with the separating wheel 215, whereby it will be moved forwardly out of abutting engagement with the next following piece of lumber. Such movement of the lumber will allow the stop member to return to its normal position in the path of the traveling lumber, as soon as the solenoid 49 is deenergized, which results when the upper end of the piston rod returns the stop member 98 to its normal full line position, shown in Figures 19, 20, and 25. Return movement of the member 98 to its normal position will condition the circuits to the solenoids 93 and 141 for operation when the selector unit is again operated by the inspector actuating one of the push buttons on the control panel. The circuit to the solenoid 49 is as follows: from the main line conductor 191, through the wire 128, switch 127, wire 125, through the solenoid 49, wire 124, contacts 108 and 112 of the timer; terminal post 108, and through the wire 132, to the conductor 131 of the supply circuit. (See Figure 25).

The operation of the hammer is so timed with the energization of the solenoid 49 that the latter will be energized at substantially the same time or slightly before the hammer engages the lumber, so that when the hammer returns to its normal raised position, the stop member 48 will be out of the path of the lumber to permit the latter to move forwardly, as above described.

The operation of the valve 78, is such that by the time the hammer impinges against the lumber, the valve will reach a position to permit air to be admitted into the cylinder below the piston, whereby the piston is immediately returned to its normal position, shown in Figure 19. The lumber stop member 48 is returned to its normal position by the weight 42, as hereinbefore described.

Figure 18:
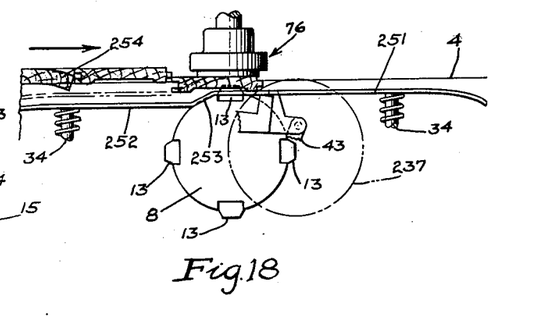
Figure 18 is a view showing a piece of hollow backed lumber being marked upon the relieved surface thereof.

The construction of this novel marking machine is such that it may be used for marking lumber of various thicknesses, as illustrated in Figure 1, without requiring any changes or adjustments to be made thereto. It is also to be noted by reference to Figure 18, that pieces of lumber, usually flooring, having their bottom faces recessed, may be marked equally as well as flat unrecessed pieces. If necessary, the yieldably supported member 251, shown in Figure 18 may have a portion 252 thereof offset as indicated at 253, so that warped pieces of lumber having one edge bent downwardly, as shown at 254, will travel over the yieldably supported member without engaging the end thereof.

Figure 14:
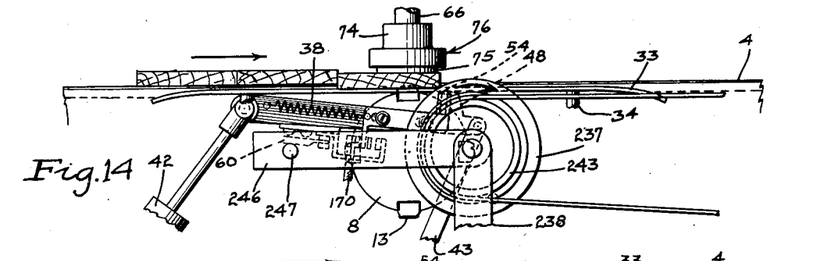
Figure 14 is a diagrammatic view showing the hammer engaged with a piece of lumber and the stop means actuated to permit the marked piece of lumber to move when released by the hammer.
Figure 15:
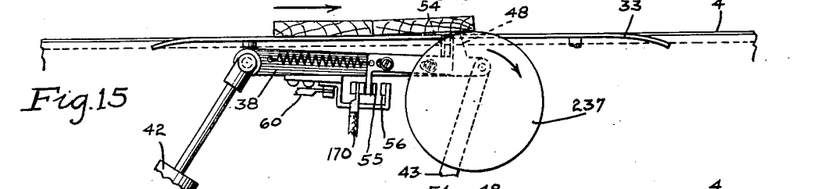
Figure 15 is a diagrammatic view showing the marked piece of lumber passing over the stop means and into engagement with the periphery of the separating wheel.

Because of the speed and ease of operation, the marker herein disclosed readily lends itself for use to mark lumber delivered thereto by rapidly moving conveyers such as are commonly used to convey lumber discharged from a plurality of planers, as indicated in Figure 2. As hereinbefore stated, when the inspector actuates one of the push buttons on the control panel 215, a selected die will be brought into position to be engaged by the lumber to be marked, and, as soon as the piece of lumber engages the upright finger 54 of the circuit-closer 53, the hammer will be actuated to move the lumber into engagement with the selected die to receive an identification mark. At substantially the same time the detent 48 will be moved out of engagement with the lumber, as shown in Figure 14, so that when the hammer disengages the lumber, the latter will move into peripheral engagement with the separating wheel 237 and be moved out of abutting engagement with the next following piece.

Because of the solenoid 49 having been deenergized as a result of the timer contact 112 being out of engagement with the fixed contact 106, as hereinbefore stated, the stop member 48 will tend to return to its normal position in the path of the next following piece of lumber by the action of the weight 42. During movement of the marked piece of lumber from the position shown in Figure 14 to that shown in Figure 16, the upper end of the lumber stop member 48 may engage the bottom face of the lumber, so that as the trailing edge of the marked piece of lumber leaves the periphery of the separating wheel 237, the stop member will move into the path of the lumber.

Figure 17:
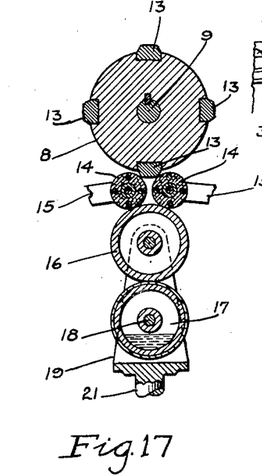
Figure 17 is a detail sectional view on the line 17—17 of Figure 11, showing only the die carrier and inking mechanism.

For each cycle of operation of the selector mechanism, the die carrier 8 will be rotated one revolution, thereby causing the selected die to receive a fresh supply of ink before it is moved into position to be engaged by the lumber. The dies most frequently used in the operation of marking the lumber are located upon the periphery of the die carrier in such a manner as to reduce to a minimum the rotary movement of the die carrier each time it is actuated. For example, if the die most frequently used is located at the bottom of the die carrier, when viewed as shown in Figure 17, the die carrier will be rotated one-half revolution each time the push button connected with that particular die is actuated, and as soon as the board has been marked, the die carrier will return to its normal position.

The parts are timed so that when the inspector actuates one of the push buttons to cause a selected die to be moved into position to be engaged by a piece of lumber, that while one piece of lumber is being marked, the operator may actuate another push button, calling for another die to be positioned for the next following board, which may be of another grade. By thus being able to make the selection of another die while one board is being marked, the operation of marking the lumber, which is an important factor in machines of this kind, is greatly expedited.

By the provision of the foot pedal 31, shown in Figure 1, the inking mechanism may be rendered inoperative, whereby soft lumber, such as pine, may be marked without inking the die, the surface of the wood often being sufficiently soft to permit the die to sink deeply into the surface thereof.

The timing of the various mechanisms is such that the hammer cannot strike the board or piece of lumber to be marked until the lumber has engaged the stop member 48 and come to rest over the die. By this arrangement, the mark impressed in the surface of the lumber will always be properly located thereon, regardless of the thickness of the board or the angle at which the board may be delivered to the die. Should a board be delivered to the die in the position shown at the right hand side of Figure 2, or at an angle with respect to the axis of the shaft 18, the mark will be impressed in the bottom surface of the board, as usual, but at a slight angle with respect to the longitudinal center line of the board.

The flexible drive for the selector and marker units, including the friction disk 192, pulley 188, and member 193, is of importance in that it arrests all rotative movements of the parts of the two units without imparting a shock thereto. The flexible drive is also such that as soon as the abutment pin 203 moves out of engagement with the abutment 205, the shaft 156 of the selector unit, and also the die carrier shaft 9, will immediately be rotated a predetermined number of degrees, depending upon the die selection.

The construction of the machine is such that it readily lends itself for use to mark practically all sizes of lumber, regardless of thickness and width, and is so simple in operation that all the inspector has to do to select the proper die is to manipulate the push buttons located upon the control panel 215, thereby allowing the inspector ample time to inspect the lumber and also to turn over an occasional piece on the conveyer chains, if necessary, to more thoroughly inspect it. The switch 127 provides means whereby the entire marking machine may be rendered inoperative by electrically disconnecting it from the supply circuit.

In some instances, where the lumber delivered to the marking machine is of a uniform grade, requiring the same die to be used for marking each board, the push button upon the control panel 215 controlling the operation of the particular die to be used, may be secured in its depressed or operative position, whereby all of the pieces of lumber of a certain grade may pass through the marking machine and automatically receive an identification mark, without the assistance of an inspector. This is particularly true when applying trade-marks to lumber whereby the mark is impressed into the surface of the lumber regardless of grade.

To thus render the marking machine automatic in operation, I have shown, in Figure 1, a member 255 pivotally mounted upon the control panel 215 adjacent to the push button 218. This member is adapted to be moved to the dotted line position indicated over the push button to thereby retain it in its depressed position. When the push button is thus positioned, each piece of lumber engaging the upright finger 54 of the lumber stop member 48 will cause the hammer to be operated and move the lumber into engagement with the die to receive an identification mark. Return of the piston rod 66 to its normal raised position will condition the circuits so that when the next following piece of lumber engages the finger 54, the hammer mechanism will again be operated. When the member 255 is in the full line position shown in Figure 1, it will be necessary for the inspector to actuate a push button to condition the hammer control mechanism for operation before the hammer can be actuated. If the inspector does not manipulate a push button, the traveling lumber will engage the stop member 48 and come to rest over the die, but the hammer will not be actuated until one of the push buttons has been depressed, it being necessary to cause the energization of one of the solenoids 141 before the solenoid 93 controlling the operation of the valve 70 can be energized.

I claim as my invention:

1. In a machine of the class described, means for feeding the lumber, a marking element adapted to apply an identification mark to the lumber, and means for exerting a blow against the lumber to move it out of its normal line of travel and into engagement with said marking element to receive an identification mark.

2. In a machine of the class described, means for feeding the lumber, a marking element, means for moving each piece of lumber into engagement with said marking element and between which and said marking element the lumber to be marked is fed, and an electrically operated remote control for said lumber moving means.

3. In a machine of the class described, means for feeding the lumber, a marking element adapted to apply an identification mark to the lumber, means for exerting a blow against the lumber to move it out of its normal line of travel and into engagement with said marking element to receive an identification mark, and a remote control for said lumber moving means.

4. In a machine of the class described, means for feeding the lumber, a marking element for applying an identification mark to the lumber, means for moving the lumber into engagement with the marking element, a stop member for temporarily arresting feeding movement of the lumber during the marking operation, and an electrically operated remote control mechanism whereby the operation of the lumber moving means and said stop member may be controlled.

5. In a machine of the class described, a marking element, means for yieldably supporting a piece of lumber adjacent thereto, and means for exerting a blow against the lumber to cause the element to impress an identification mark in a surface thereof.

6. In a machine of the class described, means for feeding the lumber, a marking element, means for yieldably supporting a piece of lumber adjacent thereto in position to be marked, a member for moving the lumber out of its normal line of travel and into engagement with said marking element to receive an identification mark, and means made operable by the traveling movement of the lumber to cause actuation of the member.

7. In a machine of the class described, a marking element, means for yieldably supporting a piece of lumber adjacent thereto in position to be marked, a member adapted to move the lumber into engagement with said marking element to receive an identification mark, means for feeding the lumber between said element and said member, and means for temporarily arresting the movement of the lumber therebetween.

8. In a machine of the class described, a marking element, means for yieldably supporting a piece of lumber adjacent thereto in position to be marked, a member adapted to move the lumber into engagement with said marking element to receive an identification mark, means for feeding the lumber between said element and said member, means for temporarily arresting the movement of the lumber therebetween, and a remote control mechanism for controlling the operation of said member.

9. In a machine of the class described, a marking element, means for yieldably supporting a piece of lumber adjacent thereto in position to be marked, a member adapted to impinge against the lumber to move it into engagement with said marking element to receive an identification mark, means for feeding the lumber between said element and said member, and means normally positioned to be engaged by the lumber when the latter reaches a position adjacent to the marking element, whereby said member will be actuated to move the lumber into engagment with the marking element.

10. In a machine of the class described, means for feeding the lumber, a plurality of dies, a carrier for said dies, means whereby said carrier may be actuated to cause a selected die to be positioned to be engaged by the lumber; means for temporarily interrupting traveling movement of the lumber when it reaches a position adjacent to said die carrier, means for supporting the lumber to be marked over the selected die with its adjacent face spaced from the die, and means for forcibly moving the lumber into engagement with a selected die whereby it will receive an identification mark.

11. In a machine of the class described, means for feeding the lumber, a plurality of dies, a movable carrier for said dies supported beneath the normal line of travel of the lumber, means whereby said carrier may be actuated to cause a selected die to be positioned to be engaged by the lumber; means for temporarily interrupting traveling movement of the lumber when it reaches a position over the die carrier, a member adapted to impinge against the lumber and move it into engagement with a selected die on said carrier to receive an identification mark, and means adapted to be engaged by the lumber to cause actuation of said member, and whereby said lumber interrupting means will also be actuated to release the marked piece of lumber.

12. In a machine for applying identification marks to lumber, means for feeding the lumber, a die carrier having a plurality of dies thereon, means for actuating said carrier to cause a selected die to assume a position whereby it may be engaged by a piece of lumber, a movable stop member for temporarily arresting the movement of each piece of lumber when it reaches a position adjacent to the die carrier, and an electrically controlled member adapted to exert a blow against the lumber to forcibly move it into engagement with a selected die to receive an identification mark.

13. In a machine of the class described, means for feeding the lumber, a die carrier mounted beneath the normal line of travel of the lumber and having a plurality of dies thereon, means for causing said carrier to be actuated to place a selected die in position to be engaged by a piece of lumber, a movable stop member for temporarily arresting the movement of each piece of lumber when it reaches a position over the selected die, a hammer member adapted to exert a blow against the lumber to forcibly move it into engagement with the die to receive an identification mark, and means positioned to be engaged by the traveling lumber to cause actuation of said hammer and whereby said stop member will be moved out of engagement with the marked piece of lumber.

14. In a machine of the class described, means for feeding the lumber, a die carrier mounted beneath the normal line of travel of the lumber and having a plurality of dies thereon, manual means for causing said carrier to be actuated to place a selected die in position to be engaged by a piece of lumber, a stop member for temporarily arresting the movement of each piece of lumber when it reaches a position over the die, a member mounted for reciprocal movement over said die carrier and adapted to forcibly move the lumber into engagement with the selected die to receive an identification mark, a circuit-closer on said stop member adapted to be engaged by the traveling lumber whereby said reciprocal member will be actuated to move the lumber into engagement with the die, and means whereby actuation of said circuit-closer will also cause the retraction of said stop member to release the marked piece of lumber.

15. In a machine for applying identification marks to lumber, means for feeding pieces of lumber laterally and in abutting relation, a marking element positioned out of the normal line of travel of the lumber, a stop member adapted to temporarily interrupt the movement of each piece of lumber when it reaches a position adjacent to the marking element, means situated adjacent to the line of travel of the lumber and adapted to forcibly move each piece of lumber into engagement with said marking element, and means for moving the marked piece of lumber out of abutting engagement with a following piece of lumber.

16. In a machine for applying identification marks to lumber, means for feeding the pieces of lumber laterally and in abutting relation, a plurality of marking dies movably supported beneath the normal line of travel of the lumber, manual means for causing a selected die to be moved into position to be engaged by a piece of lumber, a stop member adapted to temporarily interrupt the movement of each piece of lumber in position over the selected die, a member mounted for reciprocal movement over said die and between which and the selected die the lumber to be marked is fed, means positioned to be engaged by the lumber to cause said reciprocal member to operate and move the arrested piece of lumber into engagement with the die to receive an identification mark, and whereby said stop member will be retracted to release the marked piece of lumber, and means situated adjacent to said stop member adapted to move said marked piece of lumber out of abutting engagement with the next following piece whereby said stop member may return to its normal position in the path of the traveling lumber.

17. In a machine for applying indentification marks to lumber, a movable die carrier having a plurality of dies thereon positioned beneath the normal line of travel of the lumber, a stop member adapted to temporarily interrupt the traveling movement of each piece of lumber when it reaches a position over said die carrier, means for yieldably supporting the lumber while at rest over said die carrier, a hammer adapted to exert a blow against the upper surface of the lumber to move the lumber downwardly into engagement with a die, whereby an identification mark will be impressed in the bottom surface of the lumber, a manually operable remote control means for causing said die carrier to operate and position a selected die where it may be engaged by the lumber to be marked, and means responsive to the traveling movement of the lumber to cause said hammer to operate and impinge against the lumber positioned over the die, movement of said hammer causing said stop member to be retracted to permit the marked piece of lumber to pass on.

18. In an apparatus of the class described, means for feeding the lumber, a marker unit having a plurality of lumber marking dies, a lumber moving member mounted for reciprocal movement and between which and said dies, the lumber to be marked is fed, a selector unit adapted to actuate said marker unit and cause a selected die to move into position to be engaged by a piece of lumber, a remote control for said selector unit, and a driving connection between said marker and selector units including a friction drive.

19. In an apparatus of the class described, means for feeding the lumber, a marker unit including a die carrier having a plurality of lumber marking dies mounted thereon, a member mounted for reciprocal movement and between which and said die carrier the lumber to be marked is fed, a selector unit adapted to actuate said die carrier to cause a selected die to move into position to be engaged by a piece of lumber, a remote control for said selector unit, and a driving connection between said marker and selector units including a shaft adapted for continuous rotation and a friction drive for operatively connecting said marker and selector units therewith.

20. In an apparatus of the class described, means for feeding the lumber, a plurality of dies, means for actuating said dies whereby a selected die may be positioned to be engaged by the lumber, a stop member for arresting movement of the lumber when it reaches a position opposite the selected die, a hammer mounted to engage the lumber and move it into marking engagement with the die, a remote control whereby a selected die may be positioned before the lumber engages said stop member, a circuit-closer on the stop member adapted to be actuated by the lumber to close a circuit whereby the hammer will be operated to strike the lumber positioned opposite a die and move it into engagement therewith, and means operable by movement of said hammer to cause said stop member to move out of engagement with the marked piece of lumber and permit the latter to pass on.

21. In an apparatus of the class described, a carrier having a plurality of dies thereon, a hammer mounted adjacent to said die carrier and adapted to forcibly move the lumber into engagement with a die to receive an identification mark, a selector mechanism for actuating said die carrier including a plurality of electrically operated devices for limiting movement of the die carrier, a control panel situated remote from said selector mechanism and electrically connected therewith, said control panel comprising a plurality of switch elements corresponding to the number of electrically operated devices in said selector mechanism, a stop member normally positioned in the path of the traveling lumber adjacent to the die carrier and operating to stop each piece of lumber when it reaches a position adjacent to the die carrier, a solenoid for depressing said stop member, the circuit of which is normally open, a circuit breaker operatively connected with said hammer and adapted to be actuated by movement thereof, a circuit closer mounted on said stop member and adapted to be engaged by the traveling lumber to close a circuit whereby, when a switch element on said control panel has been operated, said hammer may be actuated to move the lumber into engagement with the selected die to receive an identification mark.

22. In an apparatus of the class described, a marker unit having a plurality of dies, a reciprocal member, and a lumber stop member having means for controlling the operation of said reciprocal member, a selector unit having a flexible driving connection with said marker unit and also having a mechanism for regulating the movement of said dies, a control mechanism remotely mounted from said marker and selector units and having means whereby the selector mechanism may be operated to move a selected die into position to be engaged by the lumber before it reaches said stop mechanism, said stop member, when engaged by the lumber, causing said reciprocal member to operate and move the lumber into engagement with the die to receive a mark, and means whereby said stop member will be retracted when the mark has been applied to the lumber.

23. In a machine of the class described, means for feeding the lumber, a marking element, a member adapted to move the lumber into engagement with said marking element to receive an identification mark, means for operating said member, and a control means for said operating means comprising an element positioned to be engaged by the lumber as it is fed into position to receive a mark.

24. In a machine of the class described, means for feeding the lumber, a marking element, a member adapted to move the lumber into engagement with said marking element to receive an identification mark, means for operating said member, and means made operable by the traveling movement of the lumber to cause actuation of said member.

JOSEPH G. McDONOUGH.